UNITED STATES PATENT OFFICE.

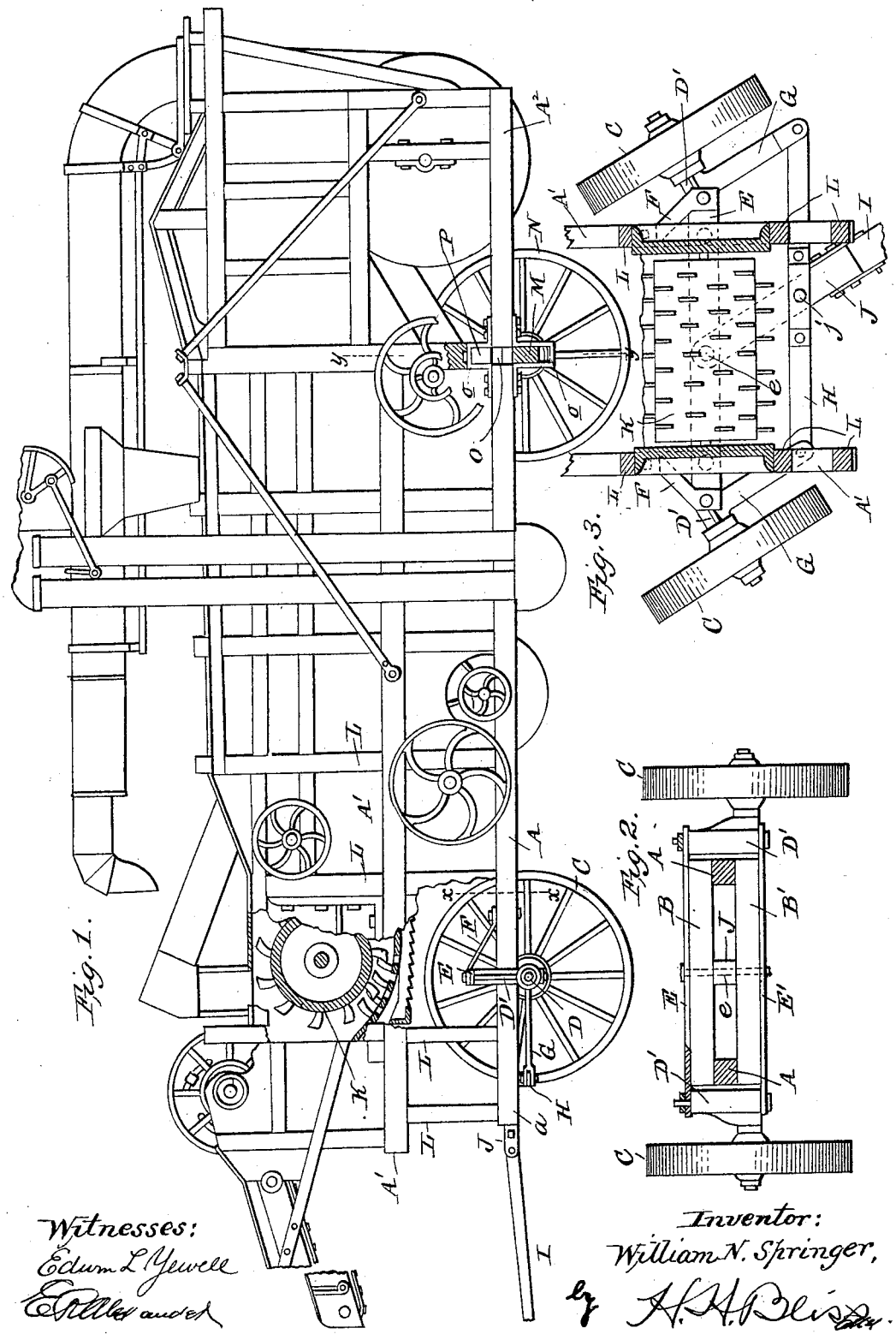

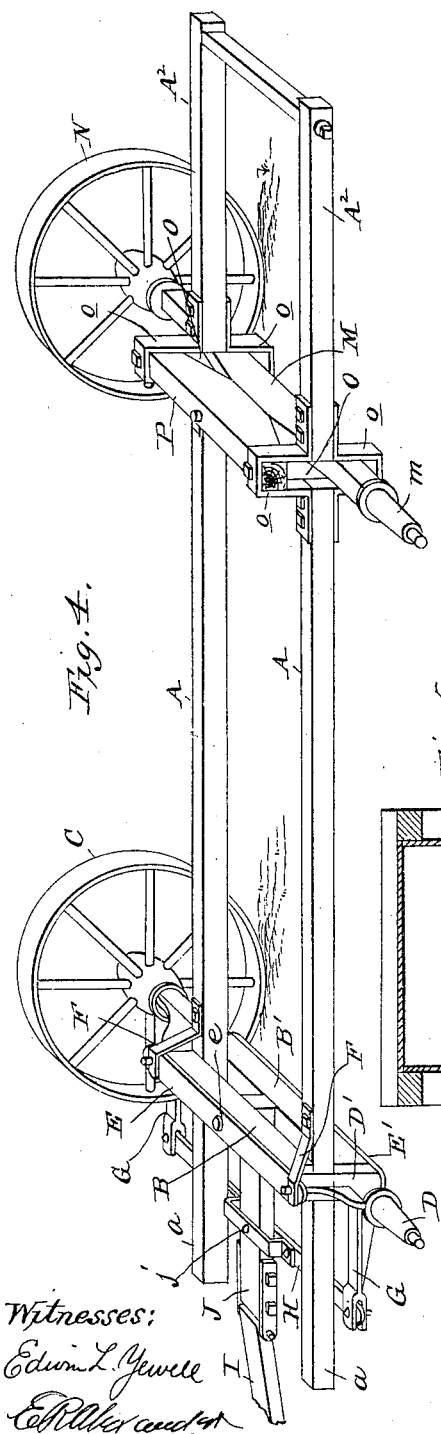

WILLIAM N. SPRINGER, OF PEORIA, ILLINOIS, ASSIGNOR TO AVERY MANUFACTURING COMPANY, OF PEORIA, ILLINOIS, A CORPORATION OF ILLINOIS.

VEHICLE-TRUCK.

No. 810,091.     Specification of Letters Patent.     Patented Jan. 16, 1906.

Application filed April 4, 1903. Serial No. 151,125.

*To all whom it may concern:*

Be it known that I, WILLIAM N. SPRINGER, a citizen of the United States, residing at Peoria, in the county of Peoria and State of Illinois, have invented certain new and useful Improvements in Vehicle - Trucks, of which the following is a specification, reference being had therein to the accompanying drawings.

Figure 1 is a side elevation of a sufficient portion of the framework and parts of a threshing and separating machine to illustrate the manner of applying my invention thereto. Fig. 2 is a cross-section on the line *x x*. Fig. 3 is a plan view showing some of the parts in their relative positions. Fig. 4 is a perspective view of the truck. Fig. 5 is a section on the line *y y*, Fig. 1. Fig. 6 shows the rear axle in tilted position.

This invention relates to improvements in the framework and wheel-mounting of vehicles of the sort used for carrying and transporting the operative parts of threshing-machines. Said operative parts can of course be of any suitable sort and relative arrangement so far as concerns details.

I have herein indicated in the drawings only such parts as will enable one to fully understand the matters which constitute the present invention.

Heretofore in the construction of the frames and wheel-mountings of vehicles of this sort it has been customary to employ the front axle for the two ground-wheels, which was connected to the frame at its center by king-bolt-like devices which permit it to oscillate to the right or to the left, as required, in turning. When the front-wheel mechanism was constructed and arranged in this way, it was necessary to form the framework in sections, one part or section being relatively low and the other relatively high, the vertical standards or posts connecting the sections being at lines back of the front wheels. Constructing the framework in this way at once weakens it, and the reduction of the strength occurs at places where a great amount of weight is to be carried.

I have succeeded in carrying the lower part of the frame of the thresher forward of the front axle without recessing it or removing any of its parts. I employ long side sills, which extend from the rear axle to and across the planes of the front axle. The front axle is formed of two strong beams B B', one placed above and the other placed below the sills A A and rigidly secured thereto. The sills A A are carried forward considerably beyond the front axle, the forward end portions being indicated by *a*.

The wheels C are mounted on spindles D, which are formed with or carried by the vertically-arranged axial parts D'. The latter are pivoted at the top and bottom in metallic carrier plates or bars E E', one extending across the top of the upper portion B of the front axle and the other lying below and being fastened to the under beam B'.

The union of the axle and the sills A A is strongly reinforced by means of brace-bars F, which are bolted to the sills A A and bent upward and outward and secured to the upper ends of the axial parts D' of the wheel-mounting.

With the spindles D and the axial parts D' there are formed, or to them are secured rigidly, the lever-arms G. They extend forward and are connected by a cross-bar H. The tongue I is pivoted to a lever J, which in turn is at *j* pivoted to the cross-bar H and at *e* is pivoted to the axle, its rear end being situated between and braced by the top beam B and the lower beam B'.

The cylinder of the thresher at K is mounted directly above the front axle, and with it are the adjunct parts usually in machines of this class, such as the concave, the band-cutter and feeder projecting forward, &c. These parts are not only heavy, but are so constructed and arranged as to exert considerable torsion and straining leverage upon the framework, and when the frames are recessed at the lower part of the front end, as has been common, to permit the turning of the wheels it has been necessarily weakened and less adapted to withstand the strains and pressure resulting from the presence of these parts.

I overcome the weakening of the frame beneath the cylinder and at the points where the torsional twisting resulting from the band-cutter and feeder mechanism are experienced by building the frame in the manner above described and utilizing the front-axle beams as braces and strengthening devices. From the bottom side walls A A there rise upward the standards or uprights L L, some in front of and some in rear of the front axle, and these are joined by upper sill or girder beams, as shown at A'.

The wheels are permitted to turn by the devices for mounting them, which I have above described. The radial planes of the wheels are kept in parallelism to the vertical plane of the tongue, and the latter under the draft of the horses is moved to the right or the left in steering the thresher, and it causes the front wheels to turn on their axial supports at D' in such way as to permit the ready turning of the whole structure.

The uprising parts of the frame are supported both in front and in rear of the front axle, but are not struck by the wheels, the latter being properly disposed to allow of their being freely turned, as described.

It has also been customary with the vehicle or running-gear parts of these thresher-frames to provide for the rocking or transverse tilting motion by suitable joint apparatus combined with the front axle and the frame above. I have devised a superior construction to attain this and depend upon a rocking action of the rear axle. This axle is indicated by M, the rear wheels N being mounted upon its spindles $m$. The thresher-frame is connected to this axle as follows: The bottom side sills are formed with metallic loops O interposed between the rear ends of the parts A A of the sills and the extension parts $A^2$. Each loop is preferably formed of two angle-bracket castings $o$, the foot portions of the brackets being bolted together and to the adjacent ends of the sill parts A and $A^2$.

P is a pillow-block rigidly fastened to the loop-irons O O, and therefore rigidly fastened to the thresher-frame. Its thickness vertically is reduced from the central portion toward the ends, the higher central portion resting upon the central part of the axle M. They are held together loosely at the center by the vertical bolt Q. The rear axle can rock to allow the wheels to pass over irregularities in the surface of the ground—that is, to say, either end can rise or fall within limits without affecting the horizontal position of the thresher-frame. In this way I avoid the severe jolts and wrenches of the framework which is experienced in threshers when made in the ordinary way.

I am aware that means have been heretofore used or proposed for turning the front wheels of vehicles by means of short vertically-hinged stub-axles and of course do not broadly claim such matter as of my invention, and I am also aware that vehicles have been known with connecting devices interposed between the body parts and one or both of the axles, which would permit a vertical vibrating of the axles without vibrating the body part; but I believe myself to be the first to have constructed the framework of the threshing-machine and to have mounted it upon the wheel-carrying parts in such way as to produce an improved thresher-mounting of the kind which I have shown and described.

What I claim is—

1. The herein-described truck for threshing and separating mechanism, consisting of the combination of the rear wheels and axle, the front-axle beams, the side-sill bars A A adapted to support the thresher-frame and extending across the front-axle beams to points in front thereof, the support for the threshing-cylinder connected to the side sills at points in front of the front axle and at points in rear thereof, the front wheels in the transverse line of the said front-axle beams, the vertical hinges for the wheels, the lever-bars connected with the wheel-spindles, and the laterally-swinging draft devices connected with the said lever-arms, substantially as set forth.

2. In a truck for a threshing and separating mechanism, the combination of the bottom side sills A A adapted to support the threshing-cylinder, its supporting-frame and the band-cutting and feeding apparatus secured to and projecting forward from said frame and extending continuously from the cylinder-supporting framework backward to the rear axle, the front-axle beams situated on transverse lines behind the front ends of the said sills A A, the front wheels intersecting the horizontal planes of the said sills A A, the short stub axles or spindles for said front wheels hinged on vertical axes, the lever-arms connected to said stub-spindles, the laterally and vertically vibratable tongue and means for connecting said tongue with the said lever-arms, substantially as set forth.

3. In a truck for a threshing and separating mechanism, the combination of the framework supporting said mechanisms, the front wheels, wheel-supporting devices adapted to hold the axes of said wheels against vertical vibration, but permitting horizontal vibration thereof, the thresher-frame sills A A extending continuously forward of the said front-wheel axes, the rear wheels, the support for the rear wheels adapted to permit their axes to vibrate vertically in relation to the thresher-frame, and means for holding them against vibration horizontally, substantially as set forth.

4. In a truck for a threshing and separating mechanism, the combination of the framework adapted to support the threshing and straw-separating devices and having the bottom elongated sill-bars A A, the axle-loops O extending from below said sill-bars to points above them, the extension sill-bars $A^2$ at the rear of and secured to said loops, the rear axle passing through the said loops, the ground-wheels on the said axle, means for preventing the endwise movement of the axle relatively to the frame, but permitting it to rock vertically, the front wheels situated behind the front ends of the sill-bars A A, and each adapted to be turned horizontally on an independent vertical axis, substantially as set forth.

5. In a vehicle-truck, the combination of the elongated sills A A, the front-wheel-supporting devices arranged between the ends of the said sills in a plane transverse to the said sills and adapted to hold the wheels against vertical vibration but permitting the horizontal vibration thereof, the front wheels mounted on said supporting devices, the rear wheels, the support for the rear wheels adapted to permit their axes to vibrate vertically in relation to the sills A A, and means for holding the said rear wheels against vibration horizontally.

6. In a vehicle-truck, the combination of the bottom elongated sills A A, the axle-loops O extending from below the said sills to points above them, the extension-sills $A^2$ at the rear of and secured to the said loops, the rear axle passing through said loops, the ground-wheels on the said axle, means for preventing the endwise movement of the axle relative to the frame, but permitting it to rock vertically, the front axle, and the front wheels mounted thereon.

In testimony whereof I affix my signature in presence of two witnesses.

WILLIAM N. SPRINGER.

Witnesses:
LEE W. HAZARD,
G. W. PERRY.